Sept. 24, 1968   O. L. APFELBECK   3,403,265
TEMPERATURE COMPENSATED TUNNEL DIODE VOLTAGE COMPARATOR CIRCUIT
Filed Oct. 21, 1964

United States Patent Office 3,403,265
Patented Sept. 24, 1968

3,403,265
TEMPERATURE COMPENSATED TUNNEL DIODE VOLTAGE COMPARATOR CIRCUIT
Otto L. Apfelbeck, Shawnee Township, Ohio, assignor to Westinghouse Electric Corporation, Pittsburgh, Pa., a corporation of Pennsylvania
Filed Oct. 21, 1964, Ser. No. 405,448
3 Claims. (Cl. 307—235)

The present invention relates to voltage comparators, and more particularly to voltage comparators in which measurement sensitivity is achieved by means of temperature compensated tunnel diode circuitry.

One manner in which the level of a given voltage can be detected and monitored is by comparing it with another known or unknown voltage and producing an electrical output when the difference between the two voltages exceeds a predetermined amount. In many applications, such as aerospace power supply systems, a voltage measuring comparator circuit is desirably highly sensitive and accurate. Voltage measurement sensitivity depends on the relative magnitude of the measured voltage difference and accuracy depends on the constancy with which the voltage measuring sensitivity is maintained.

Semiconductor switching device circuitry or tunnel diode circuitry can be employed for comparing voltages in the manner indicated. Thus, a bias current and a current representative of the difference between a reference or other voltage and a measured voltage can be fed additively to a tunnel diode. Sensitivity is achieved by making bias current say 90 to 95% of the characteristic peak current of the tunnel diode. When the difference current (and hence the measured voltage) reaches or exceeds a predetermined value, a peak current is produced through the tunnel diode which then switches from a low voltage state to a high voltage state. The voltage change is coupled to an output to indicate the departure of the measured voltage level.

In various applications, the described tunnel diode circuitry can be limited in utility by variation in ambient temperatures. In partcular, temperature variation can result in: (1) Variation of the bias current because of temperture induced variation in bias supply voltage and (2) variation in the characteristic peak current of the output tunnel diode because of temperature induced changes in the solid state characteristics of the tunnel diode. As a consequence, the operation of the tunnel diode circuitry is adversely affected since its voltage sensitivity (namely, the difference current required for switching the output tunnel diode) varies with the variant bias current and the variant characteristic peak current of the output tunnel diode.

In accordance with the principles of the present invention, a comparator circuit comprises an output tunnel diode to which there is fed a bias current and a difference current representative of the difference between a measured voltage and a reference or other voltage. The bias current is periodically supplied by its circuit means which includes another tunnel diode having its characteristics peak current less than that of the output tunnel diode. Further, the characteristic peak current of the bias circuit tunnel diode is substantially matched with that of the output tunnel diode so as to require a substantially constant difference current for switching the output tunnel diode over a predetermined temperature operating range. Substantial constancy in voltage sensitivity is thus achieved for the circuit over the temperature range.

It is therefore an object of the invention to provide a novel comparator circuit which operates with improved accuracy.

Another object of the invention is to provide a novel tunnel diode comparator circuit which operates with substantially constant voltage sensitivity over a predetermined temperature operating range.

A further object of the invention is to provide a novel tunnel diode comparator circuit in which the bias current of an output tunnel diode is controlled to compensate for the temperature variant characteristic peak current of the output tunnel diode.

These and other objects of the invention will become more apparent upon consideration of the following detailed description along with the attached drawing, in which.

Figure 1:
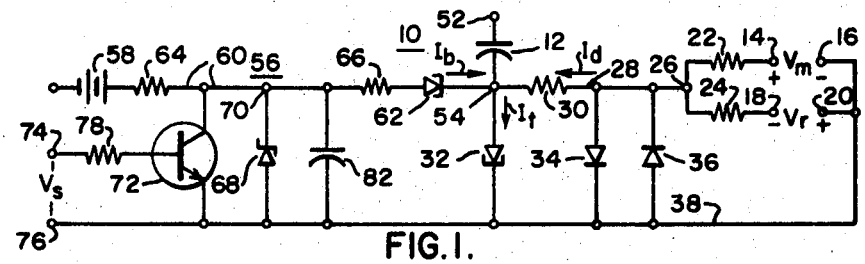
FIGURE 1 is a schematic view of a comparator circuit arranged in accordance with the principles of the invention.

More specifically, there is shown in FIG. 1 a comparator circuit 10 employed for indicating through an output coupling capacitor 12 the level of an input DC voltage $V_m$ between terminals 14 and 16 as compared with the level of an input reference or other DC voltage $V_r$ between terminals 18 and 20. The voltages $V_m$ and $V_r$ are connected in bucking relation, as indicated by the polarity signs, through respective resistors 22 and 24 to a common junction 26 so that a difference current $I_d$ is produced in circuit branch 28. A resistor 30 is connected in the branch 28 to limit the magnitude of difference current $I_d$ which is fed to an output semiconductor switch or tunnel diode 32. Diodes 34 and 36 are connected between the circuit branch 28 and common connector 38 also to serve the purpose of limiting difference current $I_d$ through the tunnel diode 32.

Figure 3:
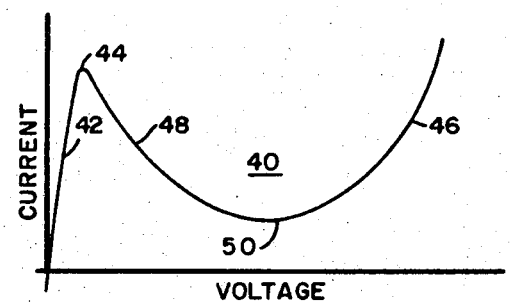
FIG. 3 shows a typical characteristic curve for a tunnel diode.

The output tunnel diode 32 is particularly adapted for providing an output voltage comparison indication through the output capacitor 12 since its solid state abrupt P-N junction structure is characterized with two stable voltage states. Thus, as indicated by a typical characteristic curve 40 in FIG. 3, the tunnel diode 32 has a low voltage state 42 in which current rises to a peak value 44. When the tunnel diode 32 is switched to its high voltage state 46, the diode current decreases as the diode voltage increases throughout a negative resistance portion 48 of the characteristic curve 40. When the diode current reaches a valley or holding value 50, the high voltage state 46 is reached and the current again begins to increase. The voltage change across the tunnel diode 32 when it switches from its low voltage state 42 to its high voltage state 46 is conveniently coupled to output terminal 52 through the output capacitor 12.

Further, the output tunnel diode 32 provides a basis for achieving high sensitivity in the measurement of the level of the voltage $V_m$. Thus, a bias current $I_b$ is additively fed with the difference current $I_d$ through common junction 54 to the output tunnel diode 32. Flow of direct current to output terminal 52 from the junction 54 is blocked by the coupling capacitor 12. The bias current $I_b$ is preferably set to be say 90% to 95% of $I_t$ which is the sum of $I_b$ and $I_d$. Only a small difference current $I_d$ is then required to switch the output tunnel diode 32 to provide high voltage measurement sensitivity for the circuit 10.

The bias current $I_b$ is derived from bias circuit means 56 which is energized by a suitable DC power supply 58. $I_b$ flows in a path 60 from the supply 58 to the junction 54 through another semiconductor switch or tunnel diode 62. The characteristic peak current of the bias circuit tunnel diode 62 is less than that of the output tunnel diode 32 so that an increment of difference current $I_d$ is always required to switch the output tunnel diode 32 when the bias circuit tunnel diode 62 is switched to a high voltage state.

Further, the characteristic peak current of the bias circuit tunnel diode 62 is matched with that of the output tunnel diode 32 over a predetermined temperature operating range. That is, while the peak current of the bias circuit tunnel diode 62 is less than that of the output tunnel diode 32, the characteristic peak currents of the two diodes increase or decrease in equal amounts with changes in temperature over the preselected temperature operating range. In this manner, the bias current for the output tunnel diode 32 is compensated for temperature variations and the amount of difference current $I_d$ required for switching the output tunnel diode 32 into a high voltage state is substantially constant over the preselected temperature operating range. Voltage measurement sensitivity is thus made substantially constant within the temperature operating range for the circuit 10. In constructing a circuit in accordance with the principles of the invention, selection of the tunnel diodes 32 and 62 by the guideposts indicated herein is within the province of the artisan skilled in the pertaining art.

Bias voltage and current conditions in the tunnel diodes 32 and 62 are determined by resistors 64 and 66 in the path 60 and by a voltage limiting (Zener) diode 68 which bridges the path 60 from junction 70 to common connector 38. The resistance of the resistor 66 and the characteristic breakdown voltage of the diode 68 are set such that, in combination with the low voltage dynamic resistance of the tunnel diodes 32 and 62, the bias current $I_b$ can always exceed the characteristic peak current of the bias circuit tunnel diode 62 and such that, in combination with the forward voltage drop of the bias circuit tunnel diode 62 in its switched high voltage state and the low voltage dynamic resistance of the output tunnel diode 32, the bias current $I_b$ cannot exceed the characteristic peak current of the output tunnel diode 32.

In addition, the resistance of the resistor 66 and the characteristic breakdown voltage of the Zener diode 68 are set such that, in combination with the switched high voltage drop across the tunnel diodes 32 and 62, the bias current $I_b$ is greater than the characteristic valley current or minimum holding current of both tunnel diodes 32 and 62. The resistor 64 generally is selected to limit the Zener diode current. With the indicated bias circuit parameters selected in the manner indicated, there is assured: (1) development of bias current $I_b$ sufficient in magnitude to switch the bias circuit tunnel diode 62 but insufficient of itself to switch the output tunnel diode 32 and (2) sufficient bias current $I_b$ and thus sufficient total current $I_t$ to hold the output tunnel diode 32 in its high voltage state once it has been switched.

In order to provide for periodic voltage level measurement, the tunnel diodes 32 and 62 are respectively reset to a low voltage state with a predetermined frequency by means of a transistor switch 72 which has its emitter-collector path connected between the junction 70 and the common connector 38 and controlled by asynchronizing signal $V_s$ applied to the transistor base-emitter path through terminals 74 and 76 and resistor 78. By "reset to allow voltage state," it is meant to include instances in which the diode 32 or 62 is in either a low voltage state or a high voltage state at the time of reset.

Figure 2:
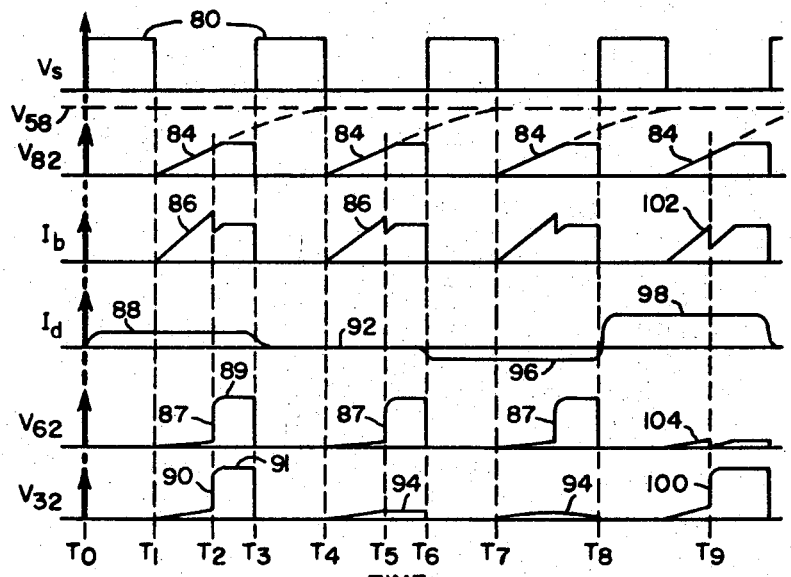
FIG. 2 shows significant voltage and current waveforms associated with the circuit of FIG. 1.

As indicated in FIG. 2, the synchronous signal $V_s$ is preferably formed by a time series of positive pulses 80 which successively switch the transistor switch 72 from a non-conductive state to a conductive state. Each time the transistor swtich 72 becomes conductive, the tunnel diodes 32 and 62 are shunted by a substantially short circuit path through the transistor switch 72 to switch the tunnel diodes 32 and 62 to a low voltage state if the tunnel diodes 32 and 62 had previously been in a high voltage state. In the time intervals between the signal pulses 80, the transistor switch 72 is substantially non-conductive and the voltage provided by the power source 58 is applied to the tunnel diodes 32 and 62 as previously described. However, capacitor 82 is preferably connected between the path 60 and the common connector 38 so as to delay the rise in voltage across the tunnel diodes 32 and 62 after termination of each pulse 80. The voltage rise delay provided by the capacitor 82 is generally indicated by reference character 84 in FIG. 2.

In operation, successive voltage level readings are detected by the output tunnel diode 32 and indicated through the coupling capacitor 12 at a rate determined by the frequency of the synchronous signal $V_s$. Generally, if the difference current $I_d$ is above the predetermined minimum value, the output tunnel diode 32 is switched into a high voltage state and the voltage change coupled to the output terminal 52 indicates this fact. Otherwise, the output tunnel diode 32 remains in its low voltage state and no output signal is obtained.

Typically, a time series of circuit events could be as indicated by the waveforms shown in FIG. 2. Thus, assume that at time $T_0$ a pulse 80 is applied to the transistor switch 72 so that the bias current $I_b$ and the voltages across the tunnel diodes 32 and 62 are zero for the duration of the pulse 80 (namely until time $T_1$).

At time $T_1$, the pulse 80 is terminated and the transistor switch 72 becomes non-conductive so that voltage across the capacitor 82 begins to build up substantially exponentially toward the power source voltage $V_{58}$ as indicated by the reference character 84. The capacitor voltage is applied across the tunnel diodes 32 and 62 to increase the bias current $I_b$ through the diode 62 and, when the capacitor voltage has reached sufficient magnitude at time $T_2$, the characteristic peak current of the tunnel diode 62 is exceeded as indicated by the reference character 86 and the tunnel diode 62 switches to its high voltage state as indicated by the reference character 87. At the same point in time $T_2$ the difference current $I_d$, which in this case has been flowing from time $T_0$ as indicated by the reference character 88, is sufficient when added with the bias current $I_b$ to switch the tunnel diode 32 to its high voltage state as indicated by the reference character 90.

The tunnel diodes 32 and 62 then continue in a high voltage state as indicated by the reference characters 89 and 91. At time $T_3$, another pulse 80 is applied to the transistor switch 72. The bias current $I_b$ and the tunnel diode voltages $V_{32}$ and $V_{62}$ then return to zero until time $T_4$ when the second pulse 80 is terminated.

In the new voltage reading interval or comparison cycle, it is assumed that the difference current $I_d$ is zero as indicated by the reference character 92. The capacitor voltage $V_{82}$ again rises with delay as indicated by the reference character 84 until the bias current in the tunnel diode 62 reaches the characteristic peak current at $T_5$ as indicated by the reference character 86 and diode 62 is then switched into a high voltage state as indicated by the reference character 87. However, since the difference current $I_d$ is now zero, the output tunnel diode 32 remains in its low voltage state as indicated by the reference character 94 and no voltage change is coupled to the output terminal 52.

At time $T_6$, another pulse 80 is applied to the transistor switch 72 and the voltage and current conditions in the tunnel diodes 32 and 62 are reset as in the interval from $T_3$ to $T_4$. At time $T_7$, another new voltage level reading interval is started and in this instance it is assumed that a negative difference current $I_d$ exists as indicated by the reference character 96. As in the time interval from $T_4$ to $T_6$, the tunnel diode 62 is switched as indicated by the reference character 87 but the output tunnel diode 32 remains in its low voltage state as indicated by the reference character 94 since the total current $I_t$ provided by the sum of the bias current $I_b$ and the negative difference current $I_d$ is insufficient to switch the output tunnel diode 32.

Another new pulse 80 is then applied to the transistor switch 72 at time $T_8$ so as to reset the tunnel diodes 32 and 62 as previously described. It is now assumed that the difference current $I_d$ has a positive amplitude which is considerably greater (as indicated by the reference character 98) than the minimum difference current $I_d$ required to switch the output tunnel diode 32. In this case, the capacitor voltage $V_{82}$ again builds up as indicated by the reference character 84 but before it has reached the point where the bias current $I_b$ is sufficient to switch the tunnel diode 62 into its high voltage state, the output tunnel diode 32 is switched into its high voltage state as indicated by the reference character 100 at time $T_9$. Thus at $T_9$ the bias current $I_b$ is less than the characteristic peak current of the tunnel diode 62 as indicated by the reference character 102 and the tunnel diode 62 is in its low voltage state as indicated by the reference character 104.

Because of the temperature compensating effect provided by the bias circuit tunnel diode 62, the typical circuit operation just described or other patterns of circuit operating events can be provided with constant sensitivity to the difference current $I_d$. For example, assume that the characteristic peak current for the output diode 32 has decreased because of a temperature change so that the output tunnel diode 32 will be caused to be switched by less total current $I_t$ at a time earlier than time $T_2$ in the time interval from $T_1$ to $T_3$. Since the tunnel diodes 32 and 62 are temperature matched, the peak current of the bias circuit tunnel diode 62 is decreased by an amount substantially equal to the decrease realized for the output tunnel diode 32 and the difference current $I_d$ still must have the magnitude indicated by the reference character 88 to provide the total current $I_t$ required to switch the output tunnel diode 32. As a corollary, a lesser amount of difference current $I_d$ in this illustration would be insufficient when added to the temperature lowered peak value bias current $I_b$ through the tunnel diode 62 to switch the output tunnel diode 32.

The following parameters are given to illustrate a typical comparator circuit constructed in accordance with the principles of the invention:

| | |
|---|---|
| Tunnel diode type | IN2927 or the like. |
| Peak current of tunnel diode 32 at 25° C. | 101 microamps. |
| Peak current of tunnel diode 62 at 25° C. | 99 microamps. |
| Approximate temperature range over which tunnel diodes 32 and 62 are matched | −55° C. to +125° C. |
| Capacitor 12 | .002 mf., 500 v. DC. |
| Resistor 64 | 1.2K ohms, ½ watt. |
| Resistor 66 | 20.5K ohms, ⅛ watt. |
| Resistor 30 | 2.0K ohms, ⅛ watt. |
| Capacitor 82 | .002 mf., 500 v. DC. |
| Zener diode 68 | 2.4 volts at 10 milliamps. |
| Transistor 72 type | 2N2102. |
| Frequency of synchronous signal $V_S$ | 20,000 c.p.s. |

The foregoing description has been presented only to illustrate the principles of the invention. Accordingly, it is desired that the invention be not limited by the embodiment described, but, rather, that it be accorded an interpretation consistent with the scope and spirit of its broad principles.

What is claimed is:

1. A comparator circuit comprising an output tunnel diode having a characteristic peak current switching value and coupled with an output, difference current circuit means connected to supply a difference current to said output tunnel diode, bias current circuit means energized by a suitable energy source and connected to supply a bias current to said output tunnel diode, said bias current circuit means including another tunnel diode having another characteristic peak current switching value less than that of said output tunnel diode, said tunnel diodes having said peak current values matched over a predetermined temperature range so that said peak current values vary substantially equally with temperature change within said temperature range, said bias current circuit means further including tunnel diode voltage and current controlling means so as to provide for generating a bias current in excess of the peak current value of said bias circuit tunnel diode and in excess of respective holding current values of said tunnel diodes after said tunnel diodes have been switched but less than the peak current value of said output tunnel diode, said voltage and current controlling means including resistance means connected serially between said bias circuit tunnel diode and said energy source and further including a voltage limiting diode connected in a path which is parallel to a path in which said tunnel diodes are connected.

2. A comparator circuit comprising an output tunnel diode having a characteristic peak current switching value and coupled with an output, difference current circuit means connected to supply a difference current to said output tunnel diode, bias current circuit means energized by a suitable energy source and connected to supply a bias current to said output tunnel diode, said bias current circuit means including another tunnel diode having another characteristic peak current switching value less than that of said output tunnel diode, said tunnel diodes having said peak current values matched over a predetermined temperature range so that said peak current values vary substantially equally with temperature change wtihin said temperature range, said bias current circuit means further including tunnel diode voltage and current controlling means so as to provide for generating a bias current in excess of the peak current value of said bias circuit tunnel diode and in excess of respective holding current values of said tunnel diodes after said tunnel diodes have been switched but less than the peak current value of said output tunnel diodes, means for periodically resetting said tunnel diodes to a low voltage state so that the difference current level can be detected periodically with a predetermined frequency, said resetting means including a semiconductor switch connected in a path parallel to a path in which said tunnel diodes are connected, and a capacitor connected in another path parallel with said first and second mentioned paths so as to delay the rise in voltage across said tunnel diodes each time said semiconductor switch is opened.

3. A comparator circuit comprising an output tunnel diode having a characteristic peak current switching value and coupled with an output, difference current circuit means connected to supply a difference current to said output tunnel diode, bias current circuit means energized by a suitable energy source and connected to supply a bias current to said output tunnel diode, said bias current circuit means including another tunnel diode having another characteristic peak current switching value less than that of said output tunnel diode, said tunnel diodes having said peak current values matched over a predetermined temperature range so that said peak current values vary substantially equally with temperature change within said temperature range, said bias current circuit means further including tunnel diode voltage and current controlling means so as to provide for generating a bias current in excess of the peak current value of said bias circuit tunnel diode and in excess of respective holding current values of said tunnel diodes after said tunnel diodes have been switched but less than the peak current value of said output tunnel diode, said voltage and current controlling means including resistance means connected serially between said other tunnel diode and said energy source and further including a voltage limiting diode connected in a path which is parallel to a path in which said tunnel diodes are connected, and means for periodically resetting said tunnel diodes to a low voltage state so that difference current level can be detected periodically with a predetermined frequency.

References Cited
UNITED STATES PATENTS

| | | | |
|---|---|---|---|
| 3,164,826 | 1/1965 | McGregan | 307—88.5 |
| 3,194,982 | 7/1965 | Bentley | 307—88.5 |
| 3,207,920 | 9/1965 | Galletti | 307—88.5 |
| 3,231,756 | 1/1966 | Martin et al. | 307—88.5 |

OTHER REFERENCES

IBM Technical Disclosure Bulletin, vol. 3, No. 10, March 1961, p. 141.

ARTHUR GAUSS, *Primary Examiner.*

J. JORDAN, *Assistant Examiner.*